(12) United States Patent
Compere et al.

(10) Patent No.: US 7,866,357 B2
(45) Date of Patent: Jan. 11, 2011

(54) METHOD OF FILLING A RESERVOIR BY MEANS OF A CARTRIDGE-RESERVOIR AND ASSOCIATED CARTRIDGE

(75) Inventors: Nicolas Compere, Laval (FR); Olivier Kunstmann, Argentre (FR); Eric Riviere, Etriche (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 949 days.

(21) Appl. No.: 11/576,013

(22) PCT Filed: Sep. 26, 2005

(86) PCT No.: PCT/EP2005/054814

§ 371 (c)(1),
(2), (4) Date: Mar. 26, 2007

(87) PCT Pub. No.: WO2006/035013

PCT Pub. Date: Apr. 6, 2006

(65) Prior Publication Data

US 2008/0210331 A1   Sep. 4, 2008

(30) Foreign Application Priority Data

Sep. 27, 2004   (FR) .................................. 04 10187

(51) Int. Cl.
*B65B 3/04* (2006.01)
*B60K 15/04* (2006.01)

(52) U.S. Cl. ........................... 141/321; 141/2; 141/364; 141/383; 220/86.2; 123/1 A (58) Field of Classification Search ..................... 141/2, 141/18, 319–321, 363–364, 383–384; 220/86.2; 123/1 A See application file for complete search history.

(56) References Cited

U.S. PATENT DOCUMENTS 3,620,424 A * 11/1971 Grigsby ...................... 222/410

(Continued)

FOREIGN PATENT DOCUMENTS

EP   1 449 702   8/2004

(Continued)

OTHER PUBLICATIONS

Machine Translation of patent FR2846713 to Cheval Thierry et Pajot Pascal; Published May 7, 2004; 11 pages.*

(Continued)

*Primary Examiner*—Gregory L Huson
*Assistant Examiner*—Nicolas A Arnett
(74) *Attorney, Agent, or Firm*—Oblon, Spivak, McClelland, Maier & Neustadt, L.L.P.

(57) ABSTRACT

A method for filling a reservoir on board a motor vehicle by a reserve cartridge. The reservoir includes a filler pipe, including a device for sealed attachment of the cartridge to the pipe. The cartridge includes a latching device configured to allow the fluid to flow from the reserve cartridge into the reservoir filler pipe only when the cartridge is attached in a sealed manner to the device on the pipe. The reserve cartridge is attached in a sealed manner to the pipe attachment device and the reserve cartridge latching device is unlatched so that the fluid can flow from the reserve cartridge into the filler pipe.

17 Claims, 7 Drawing Sheets

U.S. PATENT DOCUMENTS

| | | | |
|---|---|---|---|
| 4,161,160 A * | 7/1979 | Hicks et al. | 123/1 A |
| 4,596,277 A * | 6/1986 | Djordjevic | 141/98 |
| 5,331,994 A * | 7/1994 | Bryan et al. | 137/1 |
| 5,421,295 A * | 6/1995 | Lemaire et al. | 123/179.7 |
| 5,456,217 A | 10/1995 | Thunker et al. | |
| 6,238,554 B1 * | 5/2001 | Martin et al. | 210/109 |
| 6,263,924 B1 | 7/2001 | Grosser | |
| 6,321,692 B1 * | 11/2001 | Rayner | 123/1 A |
| 6,460,582 B1 | 10/2002 | Smith et al. | |
| 6,681,811 B2 * | 1/2004 | Channing | 141/9 |
| 7,017,336 B2 * | 3/2006 | Stiermann | 60/286 |
| 7,469,661 B2 * | 12/2008 | Kunstmann et al. | 123/1 A |
| 7,523,722 B2 * | 4/2009 | Valentine et al. | 123/1 A |
| 7,591,279 B2 * | 9/2009 | Martin et al. | 137/268 |
| 2002/0007804 A1 * | 1/2002 | Tichenor et al. | 123/1 A |

FOREIGN PATENT DOCUMENTS

| | | |
|---|---|---|
| FR | 2 699 464 | 6/1994 |
| FR | 2 846 713 | 5/2004 |
| FR | 2 854 355 | 11/2004 |
| WO | 2005 024219 | 3/2005 |

OTHER PUBLICATIONS

U.S. Appl. No. 10/554,985, filed Apr. 29, 2004, Campenon et al.
U.S. Appl. No. 10/578,302, filed Jan. 22, 2007, Campenon et al.
U.S. Appl. No. 10/583,101, filed Jun. 16, 2006, Buffard et al.
U.S. Appl. No. 10/579,993, filed Nov. 9, 2006, Potier et al.
U.S. Appl. No. 10/596,314, filed Nov. 13, 2006, Kunstmann et al.

* cited by examiner

METHOD OF FILLING A RESERVOIR BY MEANS OF A CARTRIDGE-RESERVOIR AND ASSOCIATED CARTRIDGE

BACKGROUND OF THE INVENTION

I. Field of the Invention

II. Description of Related Art

The invention relates to the filling of reservoirs on board motor vehicles.

In general motor vehicles (cars, light utility vehicles, motorcycles, lorries, etc.) are fitted with reservoirs intended to contain fluids of diverse and varied kinds. So it is possible to list reservoirs containing any type of product that can be used for cleaning (screen-wash liquid), lubrication (engine oil), braking and/or suspension (hydraulic oil), cooling (coolant liquid), depolluting (additive for regenerating the particle filter, urea, etc.).

For all these fluids whose service life is often shorter than the total service life of the vehicles, it is necessary to top up the levels or, at the extreme, to refill the whole onboard reserve.

The filling operation is not easy and must take account for these fluids of requirements relating to factory filling, with extremely tight operating times in terms of flows, pressure and time. The fluids may be incorporated into the vehicle in the course of maintenance throughout its life and this is done with filling, degassing or venting requirements other than those that exist during the assembly of this vehicle on a production line.

Furthermore, the space available on any vehicle is often limited and makes it necessary to arrange interfaces specific to each type of reservoir.

Finally, many motor vehicle manufacturers do not want to leave the servicing on the vehicle to third parties in order to prevent any unauthorized maintenance on the vehicle or more simply in order to keep the vehicle buyer loyal so that he has all his maintenance done in a specialist garage.

Patent application FR 2854355 in the name of the applicant describes liquid additive reservoirs designed to be mounted on or close to the fuel reservoir of diesel engined vehicles. The filling of these reservoirs often poses problems of cleanliness and ergonomics of the operation and of reliability of the volume of additive added to the reservoir. Problems of the same kind are encountered with the other types of reservoirs on board motor vehicles.

BRIEF SUMMARY OF THE INVENTION

In this context, the object of the invention is to provide a method of filling a reservoir which reduces or eliminates the problems linked to the current reservoir architectures, particularly the problems of ergonomics, of cleanliness and of reliability of filling.

For this purpose, the invention relates to a method for filling a reservoir intended to contain a fluid on board a motor vehicle and using a reserve cartridge for the said fluid, whereby
- the reservoir is furnished with a filler pipe, comprising a device for the sealed attachment of the cartridge to the pipe,
- the cartridge is furnished with a latching device whose design is such that it allows the fluid to flow from the reserve cartridge into the reservoir filler pipe only when the cartridge is attached in a sealed manner to the device on the pipe and prevents the said flow when the cartridge is not attached in a sealed manner to the aforementioned device,
- the reserve cartridge is attached in a sealed manner to the pipe attachment device and the reserve cartridge latching device is unlatched so that the fluid can flow from the reserve cartridge into the filler pipe.

A reservoir intended to contain a fluid means a reservoir capable of storing and delivering a liquid fluid in a system on board a motor vehicle. Motor vehicle means cars, lorries and motorcycles.

The reservoir is an enclosed chamber. An enclosed chamber means a hollow body, of various shapes, usually sealed from the outside, which may be fitted with various internal or external accessories or else accessories passing through the wall of the chamber, such as valves, pipettes, liquid-vapour separators and degassing vessels.

The reservoir may be made of any material compatible with the fluid that it is likely to contain. It may for example be a plastic or a metal. The reservoir is preferably made of plastic. Plastic means any material comprising at least a polymer made of synthetic resin.

All the types of plastic may be suitable. Plastics that are well suited belong to the category of thermoplastics.

Thermoplastic means any thermoplastic polymer, including thermoplastic elastomers, and their blends. The term "polymer" means both homopolymers and copolymers (particularly binary or ternary). Examples of such copolymers are, in a non-limiting manner, random distribution copolymers, sequenced copolymers, block copolymers and graft copolymers.

Any type of thermoplastic copolymer or polymer whose melting temperature is below the decomposition temperature is suitable. The synthetic thermoplastics that have a melting range extending over at least 10 degrees Celsius are particularly suitable. As an example of such materials, there are those that have a polydispersion of their molecular mass.

In particular, polyolefins, vinyl polyhalides, thermoplastic polyesters, polyketones, polyamides and their copolymers may be used. A blend of polymers or copolymers may also be used, as can a blend of polymeric materials with inorganic, organic and/or natural fillers, such as, for example, but not limitingly, carbon, salts and other inorganic derivatives, natural fibres, glass fibres and polymeric fibres. It is also possible to use multi-layer structures consisting of stacked and fixedly attached layers comprising at least one of the polymers or copolymers described hereinabove.

The vinyl polyhalides and polyolefins are usually preferred.

A polymer that is often used is polyethylene. Excellent results have been obtained with polyethylene high density (PEHD).

In the method according to the invention, the reservoir is filled by means of a reserve cartridge specially designed for this purpose. Reserve cartridge means an enclosed chamber that may contain a liquid fluid and comprising means used to release this fluid. It is therefore to some extent a simple temporary packaging for the additive that is in fact intended to be contained during the use of the vehicle in a fixed reservoir on board the latter. From that moment on, the connection of this cartridge with the vehicle (or more precisely, with the reservoir on board the vehicle) needs to be sealed only during filling. In addition, the cartridge used may be of a very simple design (and therefore, may be discharged or reused easily and without risk), since the main functions relating to filling (particularly degassing: see below) are present on the fixed reservoir.

Preferably, this cartridge comprises a flexible wall made of plastic.

According to the invention, the reservoir is furnished with a filler pipe comprising a device for the sealed attachment of the cartridge to the pipe and the cartridge is furnished with a latching device.

The latching device is suitable for interacting with the pipe attachment device.

According to the invention, the cartridge is attached in a sealed manner to the pipe attachment device and the latching device is unlatched so that the fluid may flow from the cartridge into the filler pipe.

The fluid that the reservoir is intended to contain may be used for cleaning, lubrication, braking, suspension, cooling or depolluting in particular.

In a particularly appropriate embodiment, the invention is used in the context of depolluting the exhaust gases of motor vehicles. In this case, the fluid may for example be an additive used for regenerating a particle filter or may be injected into the exhaust gases.

Also in this context, the reservoir is a reservoir intended to contain the said additive.

In this context, the additive contained in the reservoir is a composition, as a solution in a hydrocarbon solvent, of a low-temperature combustion catalyst of solid carbon particles produced by the incomplete combustion of a heavy hydrocarbon in a spontaneous ignition engine. Heavy hydrocarbon means a liquid fuel or a fuel of thick consistency at ordinary temperature whose molecules comprise more than 9 carbon atoms. An example of such a heavy hydrocarbon is a petroleum blend called gasoil that can be used in diesel type engines.

Examples of suitable liquid additives are iron and cerium salts in a hydrocarbon solution.

In this particular embodiment, the additive reservoir is preferably intended to be associated with (that is to say connected, attached to) a fuel system, that is to say any device incorporated into a vehicle whose main function is to store, purify, measure or convey a fuel intended for the supply of an internal combustion engine. It comprises at least one fuel reservoir and a tube for filling this reservoir with fuel.

The additive reservoir may be attached by at least one mechanical fixed attachment method allowing the additive reservoir to be connected with the fuel system, preferably on the filler tube. Examples of such fixed attachment means are, in a non-limiting manner, welding, bolting, clamping, bonding, clipping and attachment by mechanical flange. Welding and attachment by flange have given good results. In the case in which the additive reservoir is attached to the filler tube, it is usually situated outside the volume of the main fuel reservoir, that is to say that it forms a reservoir separate from the fuel reservoir to which it is only connected via one or more pipes.

The connection via one or more pipes is such that it can be used to fill the additive reservoir via the filler tube of the main fuel reservoir.

According to a first embodiment of the reservoir, the additive reservoir may replace a degassing vessel mounted on the top of the filler tube of the main fuel reservoir. Such a vessel is frequently encountered in fuel systems and may be mounted on the top of a filling tube. Its purpose is generally to separate, retain and return to the fuel reservoir the stray trails of liquid fuel that escape with the gases when the fuel reservoir is filled. In this embodiment, the degassing vessel is moved to another place in the vicinity of the fuel reservoir. It may also be deleted and its function performed by the addition to the reservoir of a special valve which performs the same function of trapping the stray trails of liquid fuel in the gas flow escaping from the fuel reservoir.

According to a second embodiment of the additive reservoir, this reservoir may be placed beside a degassing vessel mounted on the top of the filler tube of the main fuel reservoir. Generally, in this embodiment, the means of fixedly attaching the vessel to the tube are similar to those of the additive reservoir and of the tube. Additional means of fixedly attaching the additive reservoir to the degassing vessel may also be added for the purpose of stiffening the tube-additive reservoir-degassing vessel assembly.

According to a third embodiment of the additive reservoir, this reservoir may be placed in any part of the vehicle (for example in or on the main fuel reservoir), but it is connected to the filler tube by at least one pipe of a shape and size suited to the geometry of the environment and to the required flow rate.

In one or other of the various additive reservoir embodiments described hereinabove, the latter may advantageously be linked to a metering device having an outlet communicating with the main fuel reservoir. Such a device may consist of various metering systems, well known per se. Examples of such systems are, in a nonlimiting manner, an electrovalve, whose opening and closure are controlled by the motor vehicle management computer, inserted into a duct leaving the bottom of the reservoir and being used to meter the natural gravity flow of a certain quantity of additive or a metering pump, actuated by an electric motor controlled by the same computer, which meters an additive flow in the direction of an injector situated on a wall of the main reservoir. Preferably, the metering system consists of a syringe pump such as that described in application FR 0320880.8 in the name of the applicant and whose content is incorporated by reference in the present application.

The metering system may be situated either directly on the additive reservoir, preferably in its bottom part, or be attached to an accessory carrier plate attached to the fuel reservoir, or else on any other element of the fuel system intended to supply the engine with the said fuel and by means of a clipping, a welding, or a bonding of the body. For example, this attachment may be achieved under the filler tube vessel, on the wall of the tube at the top (close to the head), on the wall of the reservoir or in the fuel uptake module.

In another particular embodiment, the reservoir is intended to contain urea. Specifically, with strict standards coming into force on the exhaust emissions for certain types of motor vehicles (for example lorries), devices for cleansing the nitrogen oxides (NOx) must be installed. A solution for reducing the NOx emissions to the required value consists in producing a selective catalytic reaction with urea. To do this, the vehicles must be fitted with a reservoir containing a urea solution, and a device for metering the quantity of urea to be injected into the exhaust line of the motor vehicles.

The invention also relates to a reservoir which is filled by a method of the type described hereinabove and which is mounted on a motor vehicle. This reservoir comprises a filler pipe furnished with a device for the sealed attachment of a reserve cartridge of a fluid, the said device being intended to interact with a complementary latching device on the said cartridge.

The reservoir advantageously comprises a venting device (for example a valve) and a pipe for degassing this reservoir. It may also comprise an additive filler pipe. The degassing pipe and the filler pipe preferably both lead into a device fitted to the top of the main fuel reservoir filler tube, beside a guide orifice for a fuel pump nozzle. A stopper common to the ends of these two pipes may also ensure the more or less sealed closure of these pipes, when this additive reservoir is not being filled.

If the reservoir comprises a degassing tube and a venting device, one or other of the latter is preferably furnished with a pressure and vacuum safety system. The main objective of this system is to allow the air present in the reservoir during filling to escape (pressure safety) and to replace the volume of fluid progressively consumed during the operation of the vehicle with air (vacuum safety). Advantageously, this system comprises a valve which opens only beyond a given pressure threshold (for example above 120 mbar) and this it does to prevent leaks of additive and undesirable ingress of liquid, dust, etc.

The reservoir may also comprise a safety device preventing an access to the reservoir filler pipe.

Finally, the additive reservoir may be furnished with means for visually indicating an overflow state to an operator, at the end of an additive topping up process via the filler pipe. These means may consist, for example, of a float placed in the degassing pipe (where appropriate) which rises towards the top orifice of this pipe when the reservoir is full of additive and threatens to overflow through this pipe.

Furthermore, if the additive reservoir is visible to the user (that is to say the person who is filling it), the said reservoir may be transparent or translucent and/or comprise a level bar system.

The invention also relates to a reserve cartridge furnished with a latching device for the sealed attachment to a reservoir filler pipe and capable of interacting with a complementary device on this tube.

DETAILED DESCRIPTION OF THE INVENTION

The following figures are given for the purposes of illustrating the invention, without however wishing to restrict the scope thereof.

Figure 1:
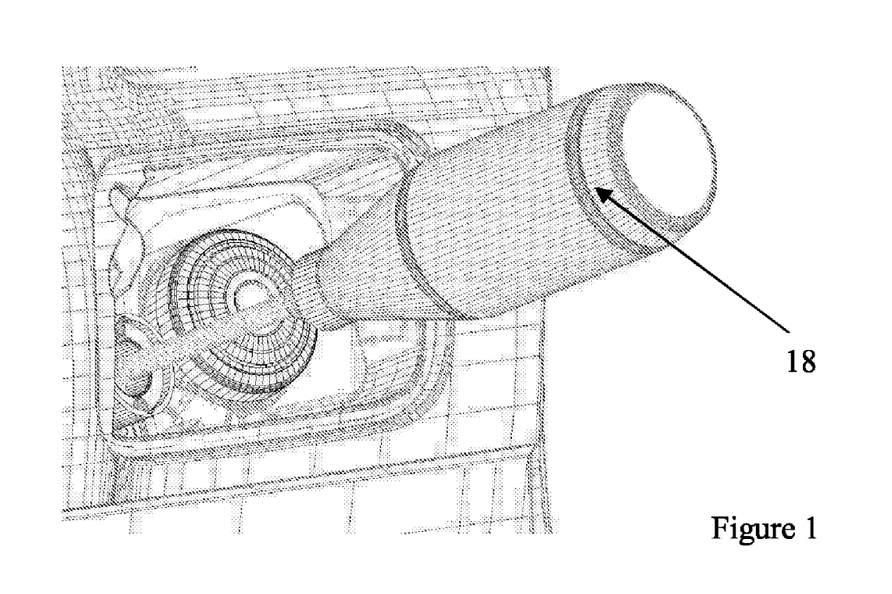
FIG. 1 illustrates a perspective view of a reserve cartridge attached to a filler interface of a reservoir according to an exemplary embodiment.

FIG. 1 shows a reserve cartridge (18) that is attached to a filler interface of an additive reservoir (not shown) and that contains a fluid with which the additive reservoir is to be filled. The filling takes place directly through the fuel flap.

Figure 2:
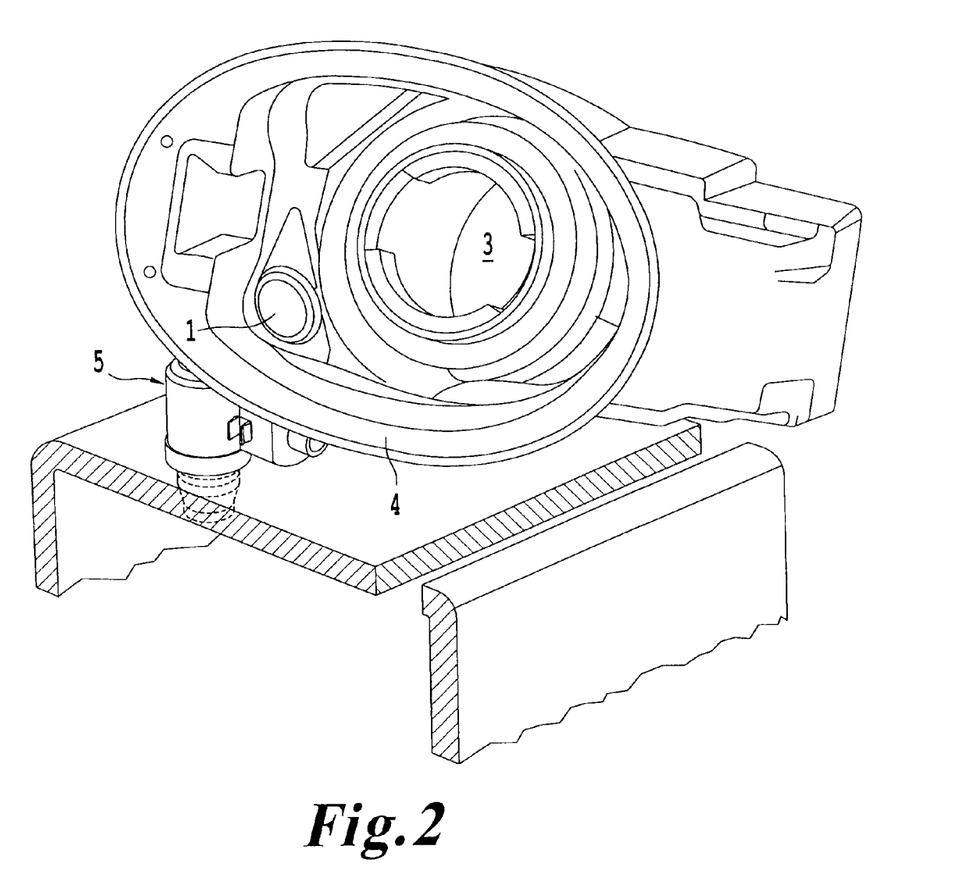
FIG. 2 illustrates a perspective view of a fuel filler flap of a reservoir according to a first exemplary embodiment.
Figure 3:
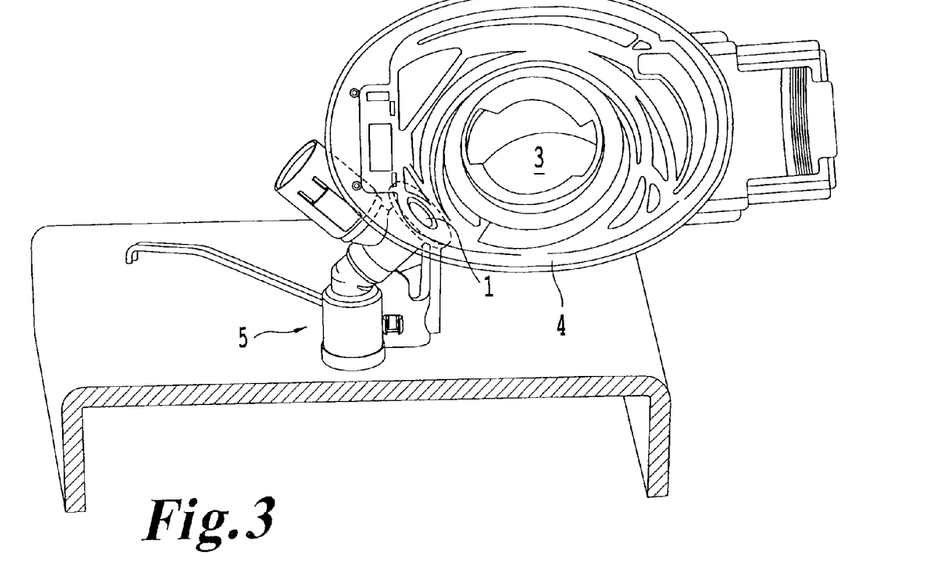
FIG. 3 illustrates a perspective view of a fuel filler flap of a reservoir according to a second exemplary embodiment.

FIGS. 2 and 3 schematise the fuel filler flap (4) of a fuel reservoir for a motor vehicle. Also shown is the opening (3) intended to receive the tip of a fuel nozzle and the filler interface (5) of the additive reservoir. The access to the interface (5) is masked by a stopper (1) which can be removed only by means of a special tool.

Figure 4:
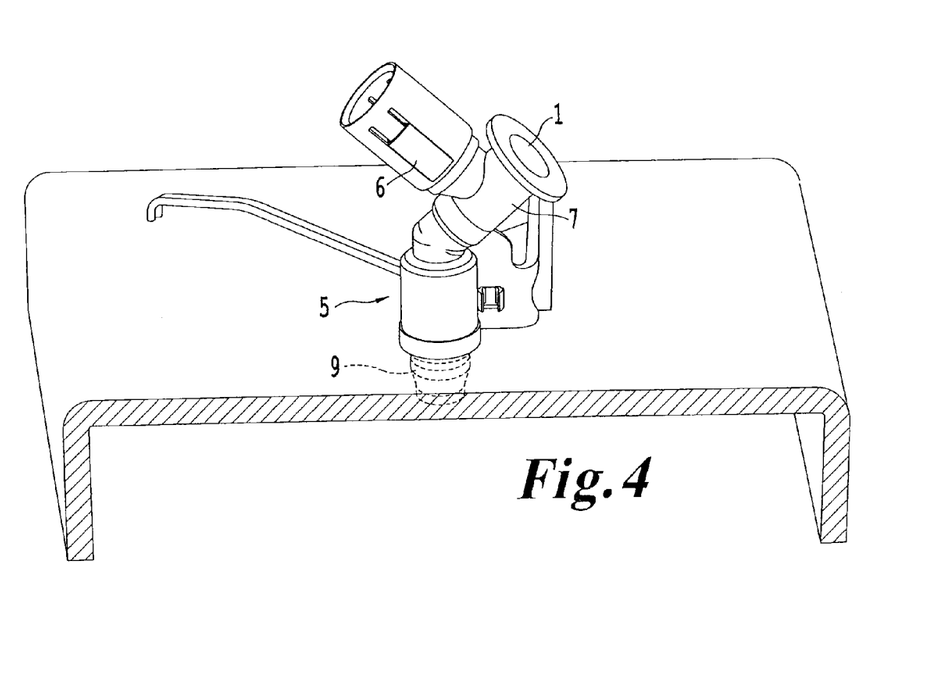
FIG. 4 illustrates a perspective view of a filler interface attached to a reservoir according to an exemplary embodiment.

FIG. 4 shows details of the filler interface (5). The interface (5) comprises the stopper (1) and a venting valve (6) allowing the additive reservoir to breath when the additive is pumped out of the reservoir. In addition, a housing (7) is provided for the element for connecting the reserve cartridge (18). Also schematised is the duct (9) which connects the interface (5) with the additive reservoir. The duct (9) is also used for degassing.

Figure 5:
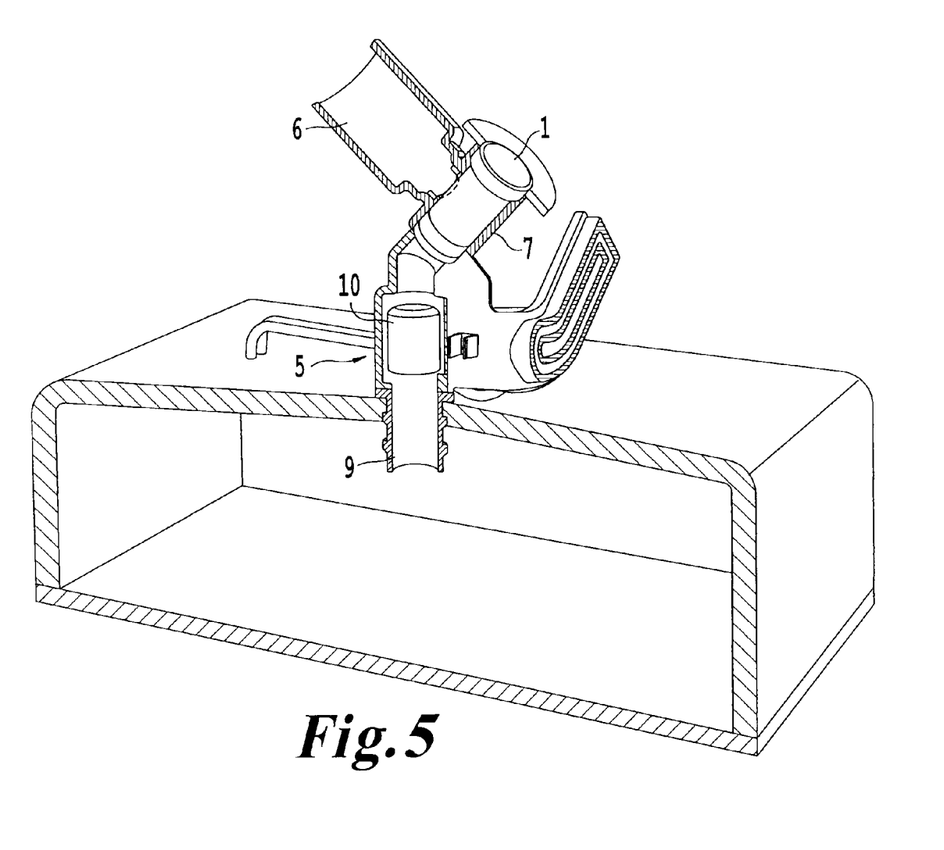
FIG. 5 illustrates a cross-sectional view of the filler interface of FIG. 4.

FIG. 5 shows a view of the inside of the interface (5) in which a float (10) can be seen which is used to close off the access to the interface when, after the additive reservoir has been filled, the maximum filling level is reached.

Figure 6:
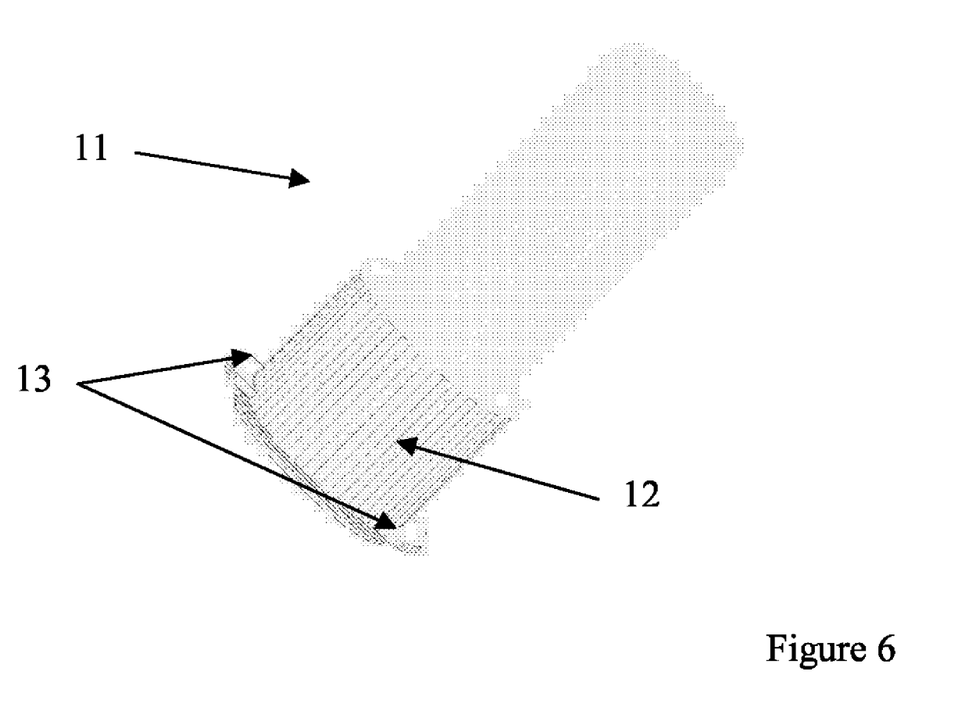
FIG. 6 illustrates a perspective view of a connection element of a reserve cartridge according to an exemplary embodiment.
Figure 7:
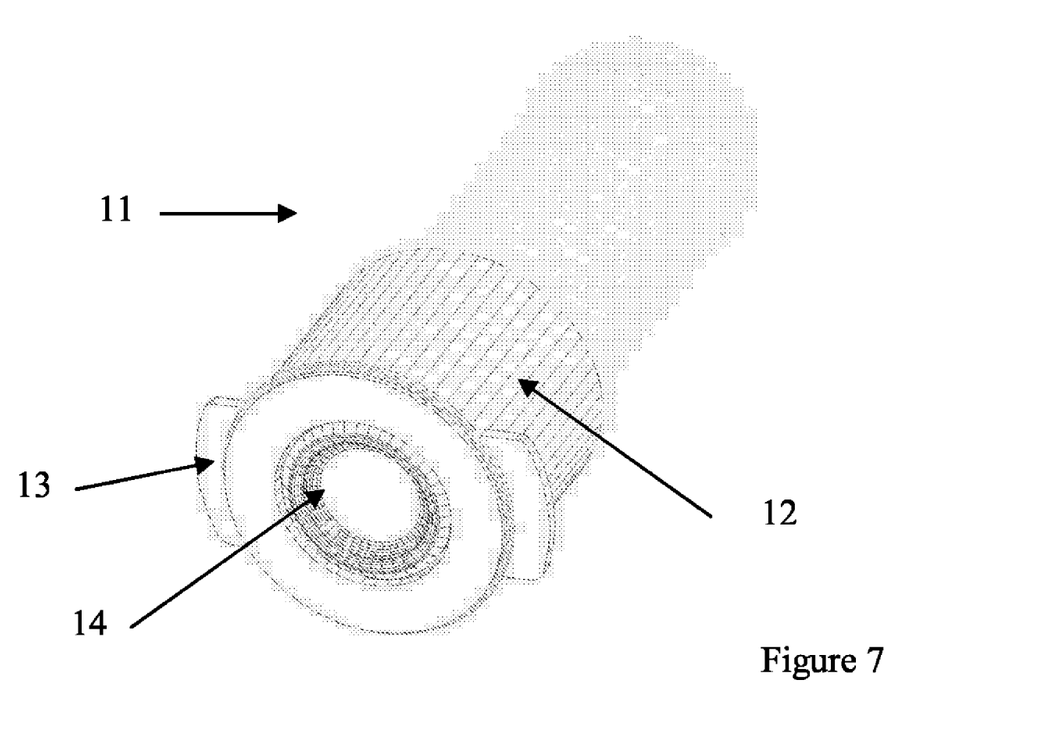
FIG. 7 illustrates another perspective view of the connection element of the reserve cartridge of FIG. 6.
Figure 8:
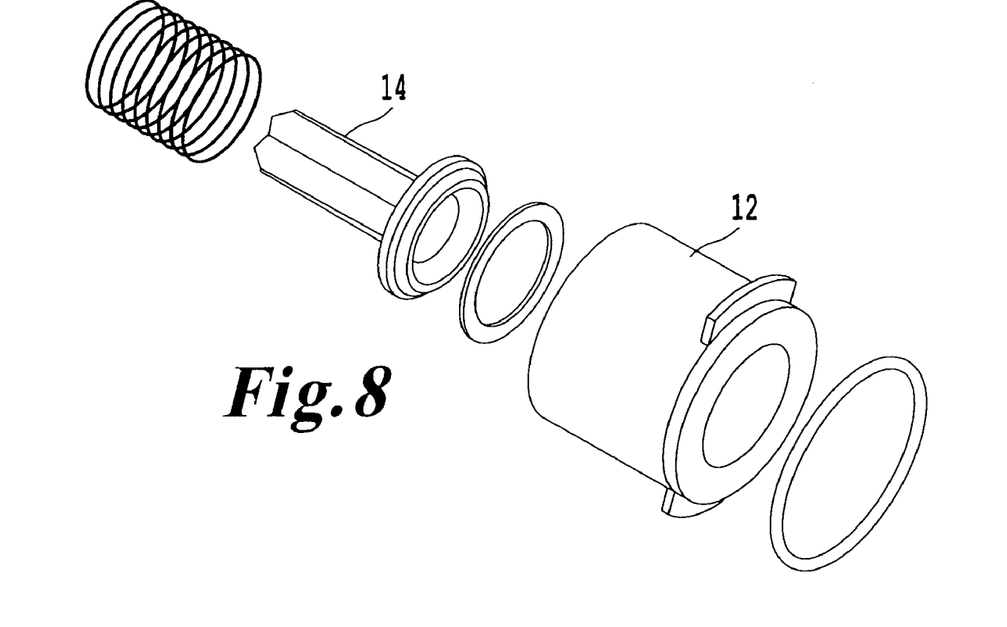
FIG. 8 illustrates an exploded view of the connection element of the reserve cartridge of FIG. 6.

FIGS. 6 to 8 show the connection element of the reserve cartridge (18). The connection element comprises one end (11) consisting of a connector (12) furnished with fins (13). The latter ensure that the connector is held on the interface (5) during the operation of filling the additive reservoir. For this purpose, the top of the interface (5) is furnished with a screw thread (not shown) into which the fins may move.

The exploded view reproduced in FIG. 8 details the components of the end (11). By rotating the connector (12) a quarter turn when attaching the end (11) to the interface (5), the movable element (14) moves in the screw thread included in the interface (5) in order to allow the additive to flow from the reserve cartridge (18) towards the additive reservoir.

The invention claimed is:

1. A method for filling a reservoir on board a motor vehicle with a fluid using a reserve cartridge, the method comprising: inserting a latching device of the reserve cartridge into an opening included in a filler neck connected to a filler pipe of the reservoir, the opening of the filler neck to communicate the latching device to an attachment device of the filler pipe;

attaching the reserve cartridge in a sealed manner to the attachment device of the filler pipe; and unlatching the latching device of the reserve cartridge to flow the fluid from the reserve cartridge into the filler pipe of the reservoir, the latching device configured to allow the fluid to flow from the reserve cartridge into the filler pipe of the reservoir only when the reserve cartridge is attached in a sealed manner to the attachment device on the filler pipe so as to prevent the fluid from flowing when the reserve cartridge is not attached in a sealed manner to the attachment device; and removing the reserve cartridge from the attachment device of the filler pipe after flowing the fluid from the reserve cartridge into the reservoir.

2. The method according to claim 1, wherein the fluid is a cleaning, lubricating, braking, damping, cooling, or depolluting fluid.

3. The method according to claim 2, further comprising using the fluid to regenerate a particle filter, wherein the fluid is an additive.

4. The method according to claim 2, wherein the fluid is urea.

5. A reservoir of a motor vehicle which is filled using a removable reserve cartridge, the reservoir comprising:

a filler pipe including an attachment device that sealably attaches the removable reserve cartridge and a filler neck connected to the filler pipe, the filler neck including an opening to receive the latching device of the removable reserve cartridge, the opening of the filler neck to communicate the latching device of the removable reserve cartridge to the attachment device of the filler pipe such that the attachment device may sealably attach the removable reserve cartridge to the filler pipe of a fluid to the filler pipe, the attachment device configured to fluidly interact with a complementary latching device on the removable reserve cartridge.

6. The reservoir according to claim 5, further comprising a degassing tube and a venting device.

7. The reservoir according to claim 6, wherein the venting device is a venting valve provided on a sidewall of the filler pipe to permit air that is present in the filler pipe during filling to escape.

8. The reservoir according to claim 5, further comprising a viewing device that indicates when the maximum filling level of the reservoir is reached.

9. The reservoir according to claim 5, wherein the filler neck is located under a fuel filler flap of the motor vehicle, and the reservoir is filled via the filler neck.

10. The reservoir according to claim 5, further comprising a float provided in the filler pipe.

11. The reservoir according to claim 5, wherein the reservoir is thermoplastic.

12. A reservoir filling system comprising:
a self-contained reserve cartridge containing a fluid, the self-contained reserve cartridge including a latching device;
a fluid reservoir including a filler pipe having an attachment device that sealably attaches the self-contained reserve cartridge to the filler pipe, the attachment device configured to fluidly interact with the latching device of the self-contained reserve cartridge, the attachment device and the latching device being complementary and a filler neck connected to the filler pipe, the filler neck including an opening to communicate the latching device of the self-contained reserve cartridge to the attachment device of the filler pipe such that the attachment device may sealably attach the self-contained reserve cartridge to the filler pipe, wherein
the self-contained reserve cartridge is removable from the fluid reservoir.

13. The reservoir filling system according to claim 12, wherein
the self-contained reserve cartridge further includes a body including a chamber containing the fluid and an elongated tip connected to the body, and
the opening of the filler neck is configured to receive the elongated tip of the self-contained reserve cartridge, the opening to communicate the latching device of the self-contained reserve cartridge to the attachment device of the filler pipe such that the attachment device may sealably attach the self-contained reserve cartridge to the filler pipe.

14. The reservoir filling system according to claim 12, wherein the fluid contained in the self-contained reserve cartridge only flows out of the self-contained reserve cartridge when the self-contained reserve cartridge is sealably attached to the filler pipe.

15. The reservoir filling system according to claim 12, further comprising a degassing tube and a venting device.

16. The reservoir filling system according to claim 12, wherein the fluid is a cleaning, lubricating, braking, damping, cooling, or depolluting fluid.

17. The reservoir filling system according to claim 12, wherein the fluid is urea.

* * * * *